United States Patent [19]

Thomsen

[11] 4,232,451
[45] Nov. 11, 1980

[54] DETECTOR FOR SENSING THE ANGULAR POSITION OF A ROTATABLE MAGNET

[76] Inventor: Ib Thomsen, Livadiavej 50, DK-6960 Hvide Sande, Denmark

[21] Appl. No.: 946,621

[22] Filed: Sep. 28, 1978

Related U.S. Application Data

[63] Continuation of Ser. No. 764,017, Jan. 31, 1977, abandoned.

[30] Foreign Application Priority Data

Feb. 19, 1976 [DK] Denmark ............................. 679/76

[51] Int. Cl.² ................................................ G05F 1/00
[52] U.S. Cl. ................................. 33/361; 33/363 R; 318/647
[58] Field of Search ................ 33/361, 363 R, 363 Q, 33/364; 324/251; 318/647

[56] References Cited

U.S. PATENT DOCUMENTS

| | | | |
|---|---|---|---|
| 3,657,629 | 4/1972 | Lloyd | 33/361 |
| 4,053,829 | 10/1977 | Maruo | 33/363 R |

FOREIGN PATENT DOCUMENTS

1175606  12/1969  United Kingdom .

*Primary Examiner*—Willis Little
*Attorney, Agent, or Firm*—Le Blanc, Nolan, Shur & Nies

[57] ABSTRACT

A detector to detect angular positions of a rotatable magnet, i.e., a magnetic compass, having one or more flux-sensitive components, namely Hall-elements. The detector includes a substantially flat and circular carrying body to be mounted on the top or bottom of a compass. On the carrying body the Hall-elements are mounted parallel to and close to the flat surface and positioned on diameters perpendicular to axes of symmetry of the flat surface. The carrying body can be rotatably fastened on the compass case and locked in desired predetermined positions.

5 Claims, 4 Drawing Figures

DETECTOR FOR SENSING THE ANGULAR POSITION OF A ROTATABLE MAGNET

CROSS-REFERENCE TO RELATED APPLICATION

This application is a continuation of application Ser. No. 764,017, filed Jan. 31, 1977, now abandoned.

The invention concerns means for detecting the angular position of a rotatable magnet, e.g. the use of a flux-sensitive component for reading the angular position of the magnet in a magnet compass.

In GB Pat. No. 1,175,606 a compass is described, which compass has either a ring-shaped magnet or a set of bar magnets, in the centre of rotation of which one or more Hall-sensors have been arranged in a vertical plane. Such special compasses are considerably more expensive than ordinary compasses and when the need of performing repairs upon them arises the use of a spare compass of the same standard is necessary.

SUMMARY OF THE INVENTION

It is the purpose of the invention to indicate detector means for the detection of the angular position of a rotatable magnet, in particular for the electronic reading of a magnet compass, using a flux-sensitive component, preferably by Hall-element which is considerably less expensive than hitherto known compasses in purchase as well as in servicing. The invention rests upon the realization that you may use the following configuration: a carrying body having a substantially flat and circular surface, which body is mounted on the top or bottom of the compass upon which body at least one Hall-element is mounted parallel to and close to the flat surface and positioned on a diameter perpendicular to an axis of symmetry of the flat surface. Thus the detector may be mounted on the outside of the compass. In this way the acquisition of a special compass may be avoided. Instead one may make use of a previously installed, ordinary compass and a spare compass to be used when performing repairs may be of the same, ordinary kind.

When one wishes to detect the position of the compass card from the outside one has to take into account that the magnetic flux density is considerably less on the outside than close to the centre of rotation of the magnet and furthermore that the pattern of the flux lines follows the meridians of an ellipsoid of rotation rather than straight lines as is the case close to the centre of rotation.

One may compensate for the reduction in flux density through increased amplification. This has to take place in any case in order to utilize the Hall-element voltages to indicate the position of the compass card or for the automatic control of the course as indicated on the compass. Unfortunately, however, the increase of amplification carries with it an increase in error, e.g. from the temperature coefficient of the Hall-element. These disadvantages are avoided through the use of the configuration described.

The use of a configuration in which the carrying body carries two Hall-elements symmetrically arranged with respect to an axis of symmetry balances the weight of the detector and makes possible the use of an electrically balanced amplifier.

By making the carrying body a printed circuit board or a thick film substrate which carries both Hall-elements and wiring a great saving in weight is obtained and the gymbal suspension of the compass is left undisturbed.

It is advantageous to use another set of two Hall-elements mounted on the same flat surface but on the axis of symmetry previously mentioned. In this way one may obtain a reliable reading from the detector even in the case of the line connecting two two primary Hall-elements being nearly parallel to the North-South line of the magent, by switching to the signal from the other two Hall-elements. The two orthogonal signals may also be used efficiently for the control of a synchro or a autopilot.

Letting the carrying body be a flat, circular disc, suitable for fastening upon the glass of the compass, said disc being capble of rotation and subsequent locking in a predetermined position and having means for the reading of the adjustable angle between the axis of symmetry of the disc and the North-South direction of on the compass card makes possible the setting of a fixed course as is known from the so-called auto-compasses. Alternately these provisions may be used for the correction of declination.

The invention is to be further described with reference to the drawings, in which FIG. 1 is a perspective drawing of an embodiment of the invention;

Figure 1:
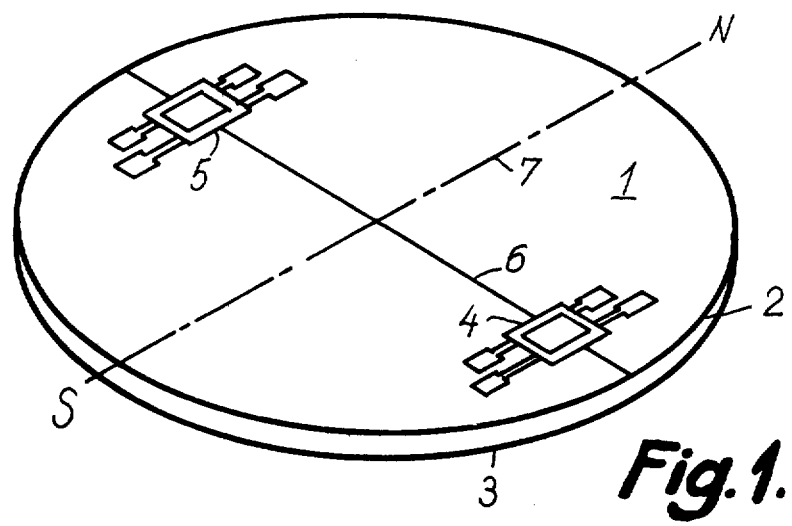
Figure 2:
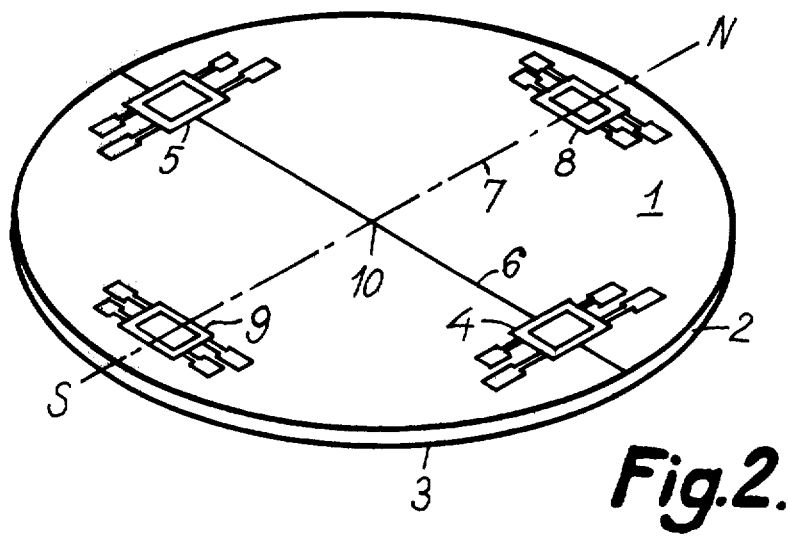
FIG. 2 is a perspective drawing of another embodiment of the invention.

In both FIGS. 1 and 2, (2) is a body having a substantially flat, circular surface (3). Parallel and close to the surface (3) is another surface (1) of the carrying body (2) upon which surface is mounted two Hall-sensors (4) and (5). Each Hall-sensor has two pairs of connections. One pair of connections is connected to a supply of constant direct current. From the other pair of connections on each Hall-sensor the Hall-voltage is taken, being proportional to the product of direct current and flux through the sensor itself. The Hall-sensors are mounted on a diameter on the surface (1) that is perpendicular to their axis of symmetry (7). When this axis of symmetry is parallel to the North-South direction of the magnetic system of the compass unto which the detector is to be mounted, the resultant flux through the sensor is zero. If, on the other hand, the compass needle is rotated from one direction through zero to the other direction, the flux through the Hall-sensors changes direction and a maximum change in Hall-voltage per degree of rotation is obtained. The Hall-sensors are connected in series as well for their direct current supply as for the resulting Hall-voltages and these latter are being added through proper choice of polarization. The circuit which is not shown is connected by means of a flexible four-conductor cable, also not shown.

In a further embodiment of the invention, shown on FIG. 2., a second pair of Hall-sensors (8), (9) is mounted of the flat surface (1) of the carrying body (2) and on the line of symmetry (7) of the first pair of Hall-sensors (4), (5). In this way it is obtained that the Hall voltages of the two pairs of sensors will be orthogonal for any angular position of the compass magnet, which voltages may be utilized for indicating the reading of the compass by means of a synchro having windings displaced 90 degrees from each other. Alternatively the output voltages may be used in a known way for controlling an autopilot.

The carrying body (2) may be a thin covering disc for a printed circuit board or a thick film circuit, on the underside of which the Hall-elements are mounted or the body (2) may be the printed circuit board itself (resp. the thick film circuit) on top which the Hall-elements are mounted.

Other flux-sensitive elements, e.g. magneto-resistors, may replace the Hall-elements.

Figure 3:
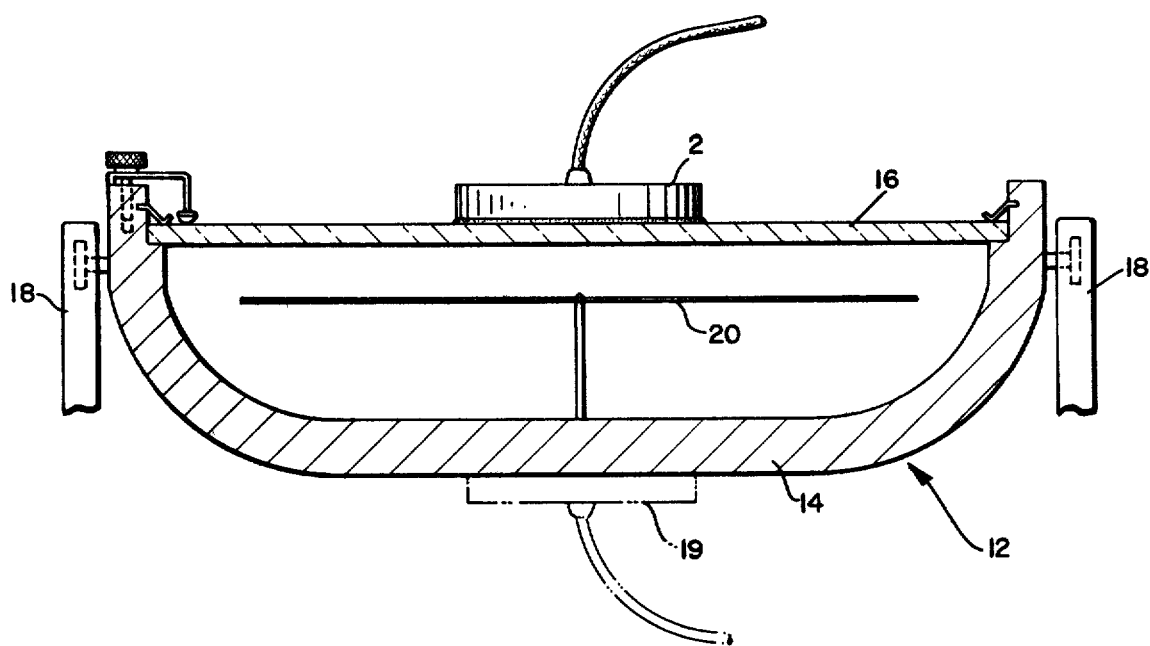
FIG. 3 is a diagrammatic cross-section view illustrating mounting of a detector disc as in the FIG. 2 embodiment on a conventional compass structure.
Figure 4:
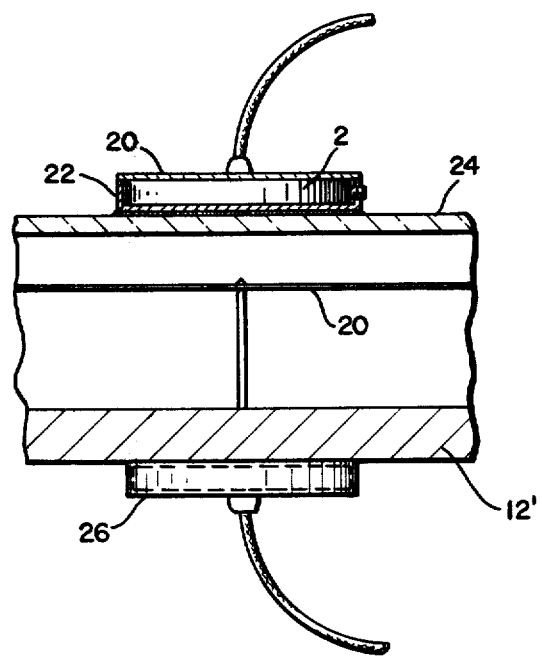
FIG. 4 is a partial cross-section illustrating the mounting of a detector disc as in the FIG. 1 embodiment on a conventional compass structure.

FIGS. 3 and 4, for clarification of understanding of the use of this invention, show several ways in which a detector disc body 2 is mounted on a conventional compass 12. FIG. 3 shows a simple compass bowl 14 in which a detector disc 2, according to the invention, is fastened to the compass glass 16, the glass with appropriate markings is rotatable on the compass bowl 14 in the manner of a grid ring and can be clamped in position by a simple arrangement such as a cam lock or thumb screw. The compass bowl 14 of most shipboard compasses are mounted in a gimbal arrangement 18. To that structure a detector 2, in accord with the inventon, is fastened (e.g. by an adhesive or cement) to the glass immediately above, or, as shown by phantom lines to the bowl below, in coaxial alignment with, and with the disc body perpendicular to the axis of the compass magnet card 20 (or needle). FIG. 4 shows an alternative mounting of a detector disc 2 to a conventional compass 12' where the disc 2 is fastened to a glass 16' which has compass direction markings and the unit is rotatable in a circular box 22 which is fastened to a conventional fixed glass cover 24 of a conventional compass as by adhesive. Alternatively, the detector disc 2 in a circular box could be glued below the compass needle or card on the bottom of the compass bowl as shown by phantom line 26 in FIG. 4.

What we claim is:

1. Detector means for the detection and electronic reading of the angular position of a magnetic compass, using flux-sensitive means, comprising: a carrying body having a substantially flat and circular surface, said body adapted to be mounted on the exterior top or bottom of a compass, perpendicular to the axis of the compass magnet, the flux sensitive means comprising at least one pair of Hall-elements mounted on said body parallel to said flat surface and symmetrically positioned on a diameter perpendicular to an axis of symmetry of the flat surface, and at least a second pair of Hall-elements substantially are mounted in the same manner as said one pair on the flat surface but at 90 degrees to the line connecting the Hall-elements in the first pair.

2. Detector means according to claim 1, in which said carrying body has incorporated therein a printed circuit board upon which the Hall-elements are mounted and which make the connections.

3. Detector means for the detection and electronic reading of the angular position of a magnetic compass, using flux-sensitive means, comprising: a carrying body having a substantially flat and circular disc with a flat surface, said body adapted to be fastened on the exterior of the glass cover of a compass, the flux sensitive means comprising at least one pair of Hall-elements mounted on said body parallel to said flat surface, symmetrically and diametrically positioned on the same diameter perpendicular to an axis of symmetry of the flat surface, said carrying body to be fastened upon the glass of the compass coaxial to the compass card in a manner enabling rotation and subsequent locking of said disc in a predetermined position relative to the compass card and adapted to be fastened to means for the reading of the adjustable angle between the axis of symmetry of the disc and the North-South direction indicated on the compass card.

4. Detector means according to claim 3, including at least a second pair of Hall-elements substantially identical to said one pair, which second pair of Hall-elements are mounted in the same manner as said one pair on the flat surface but at 90% degrees to the line connecting the Hall-elements in the first pair.

5. Detector means according to claim 3, in which said carrying body is a thick film substrate, upon which the Hall-elements are mounted and which make the connections.

* * * * *